United States Patent [19]

Shimada

[11] Patent Number: 5,248,356
[45] Date of Patent: Sep. 28, 1993

[54] METHOD OF COVERING AN AUTOMOTIVE SEAT HAVING A SEAT BELT THROUGH-BORE

[75] Inventor: Makoto Shimada, Akishima, Japan

[73] Assignee: Tachi-S Co. Ltd., Tokyo, Japan

[21] Appl. No.: 946,873

[22] Filed: Sep. 17, 1992

[51] Int. Cl.⁵ .......................... B32B 7/08; B32B 31/12
[52] U.S. Cl. ........................................ 156/93; 156/293
[58] Field of Search ............... 156/293, 245, 93, 288, 156/514; 249/96, 97

[56] References Cited

U.S. PATENT DOCUMENTS 3,841,658 10/1974 Singh .

FOREIGN PATENT DOCUMENTS 3-60148 6/1991 Japan .
3-100557 10/1991 Japan .

Primary Examiner—Caleb Weston
Assistant Examiner—Robert W. Robey
Attorney, Agent, or Firm—Oldham, Oldham & Wilson Co.

[57] ABSTRACT

A method for forming a seat belt through-bore in an automotive seat, which uses a lower die having an opening perforated therein and an upper die movable toward and away from the lower die, the method including the steps of providing a top cover member having an incision therein and two separate covering pieces sewn to a frontal surface of the top cover member such that they are disposed on the opposite sides of the incision, and turning upside down the thus-formed top cover member. In this method process, it is so arranged that, before lowering the upper die to press and bond the top cover member to a cushion member, the free portions of those two covering pieces are inserted into said opening of said lower die, so that the top cover member is placed flat upon the lower die, in order to avoid creation of undesired recession on the top cover member of resultant seat.

3 Claims, 3 Drawing Sheets

METHOD OF COVERING AN AUTOMOTIVE SEAT HAVING A SEAT BELT THROUGH-BORE

BACKGROUND OF THE INVENTION

1. Field of the Invention

The present invention relates to a method for forming a seat belt through-bore in an automotive seat, and particularly to the formation of such seat belt through bores in a bench-type seat cushion.

2. Description of Prior Art

Hitherto, the production of automotive seat assemblages involved bonding a top cover member to the surface of a foam cushion member, under a pressure, using an adhesive and a pair of upper and lower dies for that purpose. Such pressure bonding steps sometimes entail using a foam cushion member having a throughbore penetrated therethrough, and an associated cover member with a particular incision defined therein in correspondence with such through-bore of the cushion member. This is designed to permit a seat belt to pass through the seat. In most instances, the formation of seat belt through-bores is applied to such bench-type seat cushions (SC) as shown in FIG. 1.

However, referring to FIG. 2, the conventional method for forming the foregoing seat belt throughbore has encountered the problem of creating an undesired recession (1a) around the seat belt through-bore (H), which results in impairing the aesthetic appearance of the seat.

The reason for this problem is found attributed to certain steps in the conventional method, which will be explained with particular reference to FIGS. 3 and 4, as follows:

In FIG. 3;

Firstly, an upper die (U) and a lower die (L) are provided. The upper die (U) is movable vertically towards nd away from the lower die (L).

Then, between those upper and lower dies (U)(L), there is introduced a foam cushion member (2) having a pair of spaced-apart through-bores perforated therethrough of which one is shown in (21), each being in correspondence with the respective two resultant seat belt through-bores (H)(H) shown in FIG. 1, and a top cover member, (1) having a pair of spaced-apart incisions of which one is shown (7), each being also in correspondence with the respective two seat belt through-bores (H)(H). As shown, at each of those two incisions, of which only one is shown (7) of top cover member (1), there are provided a pair of covering pieces (3)(3) in a symmetrical fashion relative to one incision (7). Namely, the covering pieces (3)(3) are each made of the same material or cloth as that of the top cover member (1), and formed such as to have a width generally equal to the lengthwise width of each of the throughbores (21)(21) as can be seen from FIG. 2 as well as a length relatively longer than the height-wise thickness of cushion member (2). The two opposed ends respectively of thus-formed covering pieces (3)(3), as viewed from FIG. 3, are disposed at a point corresponding to the foregoing incision (7) of top cover member (1), and, in the vicinity of the incision (7) and the two opposed covering piece ends, each of the covering pieces (3)(3) is sewn to the upper surface of top cover member (1) at the respective points (5)(5). The distance between such sewn points (5)(5) should be generally identical with the width (W) of the through-bore (21).

Then, the thus-formed covering pieces (3)(3) are laid on and juxtaposed with the frontal surface of top cover member (1) as illustrated, and turned upside down to direct the reverse side of top cover member (1) in the upward direction, while directing both covering pieces (3)(3) and frontal side of top cover member (1) in the downward direction towards the upper surface of lower die (L). In this state, the top cover member (1) is placed upon the lower die (L). Next, an adhesive (4) is applied to the upper surface of cushion member (2) which is sought to be bonded to the reverse side of top cover member (1), and then the cushion member (2) is also turned upside down to direct its adhesive-applied upper surface in the downward direction towards the reverse side of top cover member (1) laid on the lower die, with a care being taken that the central axis of the through-bore (21) is substantially aligned with the incision (7) of top cover member (2).

Thereafter, the upper die (U) is lowered to press the cushion member (2) against the top cover member (1) on the lower die (L), so as to bond the reverse side of top cover member (1) to the upper surface of cushion member (2).

Next, as in FIG. 4;

The thus-bonded unit of top cover member (1) and cushion member (2) is again turned over, so that the frontal surface of top cover member (1) is directed upwardly, with the two covering pieces (3)(3) laying thereon as indicated by the two-dot chain lines in FIG. 4.

Then, the two covering pieces (3)(3) are turned about their respective sewn points (5)(5) and pulled down to extend through the through-bore (21) of cushion member (2), as indicated by the arrows in the same FIG. 4. The free ends respectively of the covering pieces (3)(3) are each anchored at the reverse side of cushion member (2) by means of insert wires and hog rings as shown. As a result, the seat belt through-bore (H) is formed, and a seat belt (6) may pass therethrough.

However, in the above-described steps, it is noticed that the two covering pieces (3) are pressed together with the top cover member (1) against the upper surface of foam cushion member (2) and consequently, after the pressure-bonding process using the upper and lower dies (U)(L), there is left an undesired recession (1a) upon the frontal surface of top cover member (1), tracing the shape of covering piece (3) thereon.

SUMMARY OF THE INVENTION

In view of the above-stated drawbacks, it is therefore a purpose of the present invention to provide an improved method for forming a seat belt through-bore in an automotive seat, which avoids creation of the aforementioned undesired recession in the seat. In order to attain such purpose, according to the present invention, there are basically provided the steps of:

(a) using a lower die which has an opening perforated therein;

(b) providing a top cover member which is formed with an incision;

(c) sewing a pair of separate covering pieces to a frontal surface of the top cover member, such that they are fixed on the opposite sides of the incision; thereby defining two sewn points in the top cover member there, which two sewn points are spaced apart from each other at a distance generally equal to a width of through-bore formed in a cushion member; (d) turning upside down the top cover member to direct its frontal surface in a downward direction, with the free portions respectively of those two covering pieces being dependent from the frontal surface of top cover member;

(e) then, placing the top cover member upon the lower die, such that those covering pieces free portions are both inserted through the fore going opening of lower die; and (f) subjecting the reverse side of top cover member to pressure bonding with the upper surface of cushion member by lowering the upper die toward the lower die.

Accordingly, since those two covering piece free portions are inserted into the opening of lower die during the pressure bonding process, there is never left any such recession on the frontal surface of top cover member as found in the prior art, and thus an aesthetic appearance of the seat is kept as it is.

Preferably, the opening of lower die should be substantially identical with or relatively larger than the width of the through-bore of the cushion member.

In the above-described process, after the pressure bonding process, the terminal end each of those two covering piece free portions should preferably be pulled down in the through-bore of cushion member and secured to the reverse side of cushion member by means of hog rings and insert wires embedded in the cushion member.

DETAILED DESCRIPTION OF PREFERRED EMBODIMENT OF THE INVENTION

First of all, it should be understood that the present invention is an improvement based on the previously stated prior-art method for forming a seat belt through-bore in an automotive seat, and therefore, since most of steps and elements of the prior art are identical with those of a method in accordance with the present invention, which will be described hereinafter, all like designations in the prior art description correspond to all like ones to be given in the present description and thus a specific explanation on the common steps and elements is deleted for the sake of simplicity.

Figure 1:
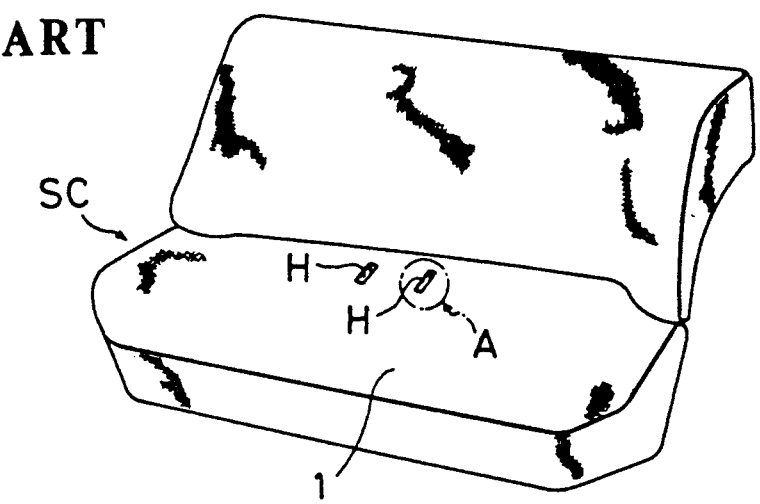
FIG. 1 is a perspective view of an automotive seat having, formed therein, a pair of conventional seat belt through-bores.
Figure 2:
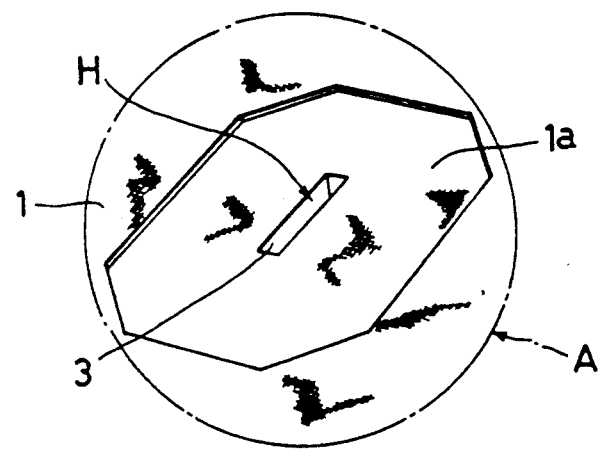
FIG. 2 is an enlarged view of the portion A in FIG. 1.
Figure 7:
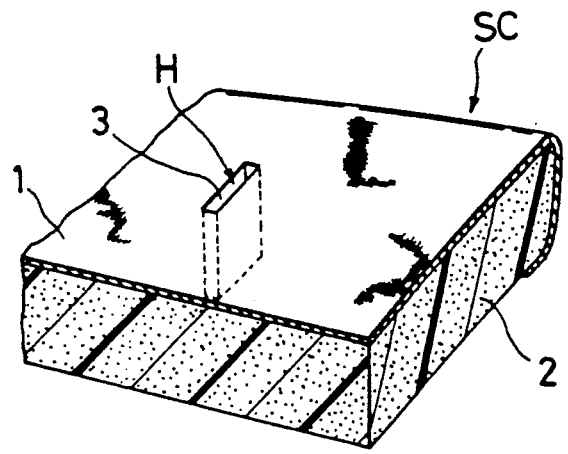
FIG. 7 is a partly broken perspective view of the resultant seat belt through-bore produced by the method in accordance with the invention.
Figure 3:
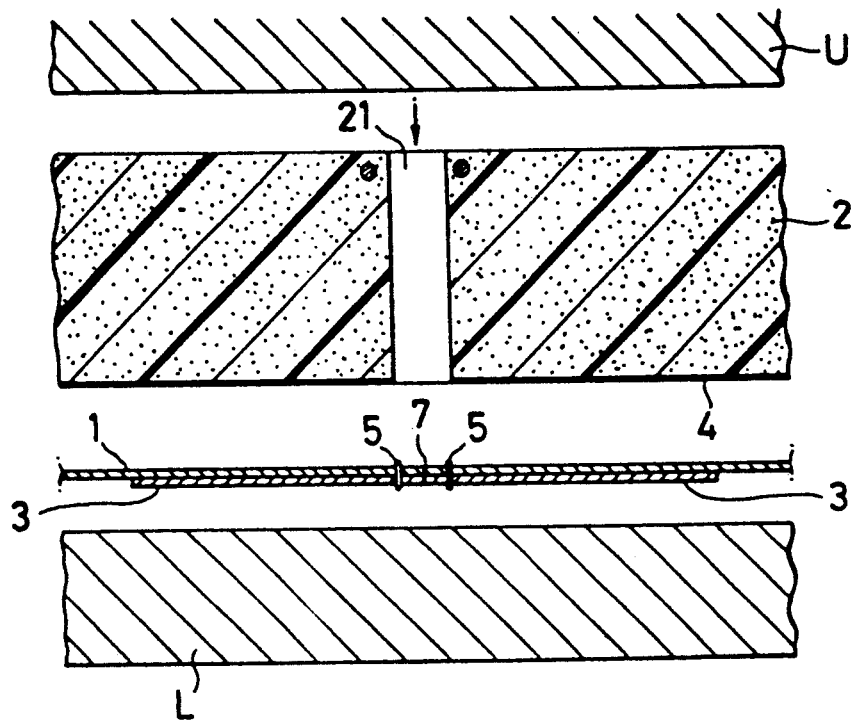
FIG. 3 is a partly broken, schematic sectional view which shows principal elements used in a conventional method for forming seat belt though-bore in the seat, indicating explanatorily the steps for executing such method.
Figure 4:
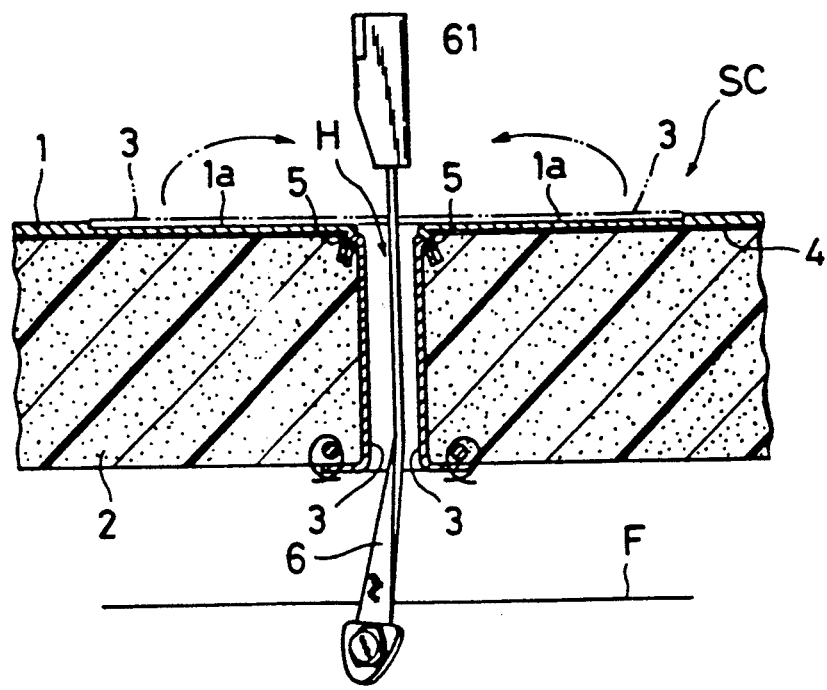
FIG. 4 is a partly broken, schematic sectional view which shows a resultant seat belt through-bore produced by the conventional method.
Figure 5:
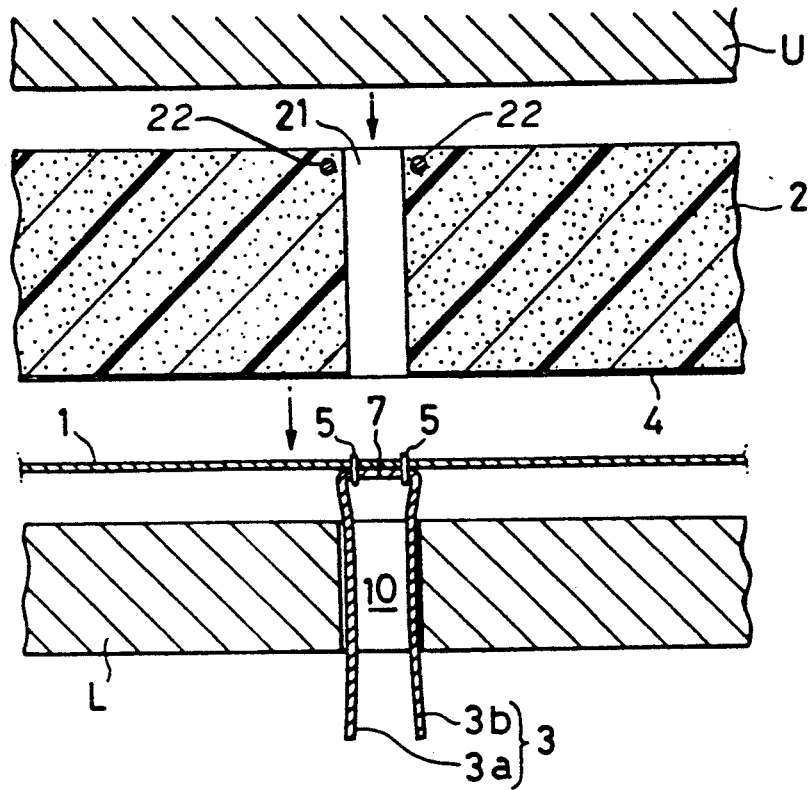
FIG. 5 is a partly broken, schematic sectional view which shows principal elements used in a method of the present invention for forming a seat belt through-bore in the seat, indicating explanatorily the steps for executing the method.
Figure 6:
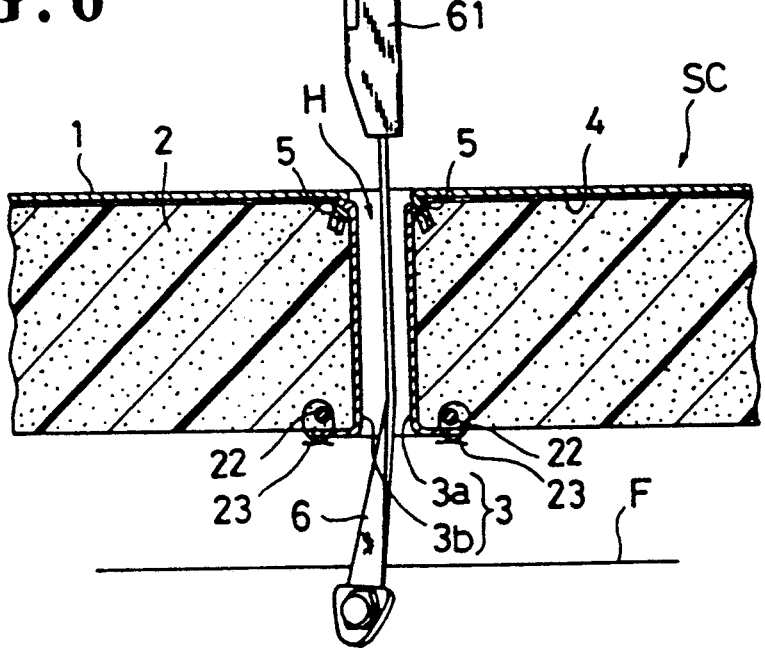
FIG. 6 is a partly broken, schematic sectional view showing a resultant seat belt through-bore produced by the method in accordance with the invention.

Reference is made to FIGS. 5 and 6, in which are illustrated the steps in accordance with the present invention. It is to be noted that all the elements used in the invention are identical to those of the prior art, only except that the lower die (L) has an opening (10) perforated therethrough.

As viewed from FIG. 5, the opening (10) is so formed to have a width generally equal to or relatively greater than the width (W) of the through-bore (21) of cushion member (2).

FIG. 5 shows the same steps as those of the prior art steps stated previously in order to pressure bond the top cover member (1) to the cushion member (2), using the upper and lower dies (U)(L) and adhesive (4). In this process, however, during the step of placing the top cover member (1) on the lower die (L), because the lower die (L) is formed with the opening (10), the two covering pieces, which are respectively given designations (3a)(3b), yet identical to those (3)(3) in the prior art description above, should be inserted through the opening (10) before laying the top cover member (1) upon the lower die (L), so that the covering pieces are dependent from the top cover member (1) within the opening (10).

Accordingly, the top cover member (1) is placed flat upon the lower die (L), without juxtaposing the two covering pieces (3a)(3b) with the top cover member (1), and after completing the pressure bonding process, those covering pieces (3a)(3b) are turned about their respective sewn points (5)(5) and pulled down into the through-bore (21) of cushion member (2). Hence, it is appreciated that there is never left such recession (1a) on the frontal surface of top cover member, which traces the shape of covering pieces (3a) (3b) thereon, as found in the prior art, and thus the aesthetic appearance of the seat is kept as it is.

The next steps are shown in FIG. 6, which involves the same series of steps as in the prior at description. In brief, the free ends respectively of those two covering pieces (3a)(3b) are secured at the reverse side of cushion member (2) by means of insert wires'(22) and hog rings (23), as shown. Thus, there is defined the seat belt through-bore (H), which allows the seat belt (6) to pass therethrough from the floor (F) for projecting the seat belt buckle (61) from the seat cushion (SC), according to the embodiment shown.

It is noted that the top cover member (1) and covering pieces (3a)(3b) are both made of a plastic leather or other suitable cloth materials.

According to the present invention, it is further appreciated that there is no need to prepare any special lower die, because only such opening (10) has to be perforated directly in the conventional lower die (L), and that the hitherto pressure bonding, method using the upper and lower dies (U)(L) is directly employed in the present invention, thus causing no failure or no defect in that forming process.

While having the present invention as above, it should be understood that the invention is not limited to the particular embodiment shown in the drawings, but any other modifications, additions and replacements may be made thereto without departing from the spirit and scope of the appended claims.

What is claimed is:

1. A method for forming a seat belt through-bore in an automotive seat, comprising the steps of:

using a lower die which has an opening perforated therein, and an upper die movable towards and away from said lower die;

pre-forming a foam cushion member which has a through-bore perforated therein;

providing a top cover member which is formed with an incision;

sewing a pair of separate covering pieces to a frontal surface of said top cover member, such that each of said separate covering pieces are fixed on opposite sides of said incision, thereby defining two sewn points in said top cover member there, said two sewn points being spaced apart from each other at a distance generally equal to a width of said through-bore of said cushion member;

turning upside down said top cover member to direct its said frontal surface in a donwnward direction, thus allowing free portions respectively of said two covering pieces to be dependent from said frontal surface of said top cover member;

then, placing said turned-over top cover member upon said lower die, such that the respective said free portions of said two covering pieces are both inserted through said opening of said lower die, while directing a reverse side of said top cover member in an upward direction applying an adhesive to an upper surface of said cushion member;

then, turning upside down said cushion member so as to direct its adhesive-applied upper surface in a downward direction;

lowering said upper die so as to press and bond said turned-over cushion member to said reverse side of said top cover member laid on said lower die;

thereafter, removing said bonded top cover member and cushion member from said upper and lower dies;

then, turning said two free portions respectively of said two covering pieces about their respective said sewn points towards said through-bore of said cushion member;

pulling said two covering piece free portions down into said cushion member through-bore; and securing a terminal end each of said two covering piece free portions to a reverse side of said cushion member, whereby said seat belt through-bore is formed in said seat.

2. The method as defined in claim 1, wherein said opening formed in said lower die is substantially identical with or relatively larger than said width of said cushion member through-bore.

3. The method as defined in claim 1, wherein said terminal ends respectively of said two covering piece free portions are each secured by hog rings to respective two insert wires embedded in said cushion member.

* * * * *